United States Patent
Bala et al.

(10) Patent No.: US 10,832,413 B2
(45) Date of Patent: Nov. 10, 2020

(54) CURVILINEAR OBJECT SEGMENTATION WITH GEOMETRIC PRIORS

(71) Applicant: Palo Alto Research Center Incorporated, Palo Alto, CA (US)

(72) Inventors: Raja Bala, Pittsford, NY (US); Venkateswararao Cherukuri, Foster City, CA (US); Vijay Kumar B G, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 90 days.

(21) Appl. No.: 16/223,519

(22) Filed: Dec. 18, 2018

(65) Prior Publication Data
US 2020/0193605 A1    Jun. 18, 2020

(51) Int. Cl.
| | |
|---|---|
| *G06T 7/11* | (2017.01) |
| *G06T 7/168* | (2017.01) |
| *G06T 7/174* | (2017.01) |
| *G06N 20/00* | (2019.01) |
| *G06N 3/08* | (2006.01) |
| *G06T 5/20* | (2006.01) |

(52) U.S. Cl.
CPC ............ *G06T 7/11* (2017.01); *G06N 3/084* (2013.01); *G06N 20/00* (2019.01); *G06T 5/20* (2013.01); *G06T 7/168* (2017.01); *G06T 7/174* (2017.01); *G06T 2207/20081* (2013.01); *G06T 2207/20112* (2013.01)

(58) Field of Classification Search
CPC . G06T 7/11; G06T 7/168; G06T 7/174; G06T 5/20; G06T 2207/20112; G06T 2207/20081; G06N 3/084; G06N 20/00
USPC .......................................................... 382/173
See application file for complete search history.

(56) References Cited

U.S. PATENT DOCUMENTS

| | | | | |
|---|---|---|---|---|
| 2013/0084000 A1* | 4/2013 | Bhardwaj | ............ | G06K 9/6215 382/165 |
| 2014/0324836 A1* | 10/2014 | Chittar | ...................... | G06T 7/90 707/722 |
| 2016/0189003 A1* | 6/2016 | Liu | ...................... | G06K 9/6267 382/155 |

(Continued)

FOREIGN PATENT DOCUMENTS

| | | | | |
|---|---|---|---|---|
| CN | 109345538 | * | 2/2019 | ............... G06T 7/10 |
| CN | 109816661 | * | 5/2019 | ............... G06T 7/10 |

OTHER PUBLICATIONS

Bibiloni et al., "A survey on curvilinear object segmentation in multiple applications," Pattern Recognition, vol. 60, pp. 949-970, 2016.

(Continued)

*Primary Examiner* — Jerome Grant, II
(74) *Attorney, Agent, or Firm* — Mueting Raasch Group

(57) ABSTRACT

A method for curvilinear object segmentation includes receiving at least one input image comprising curvilinear features. The at least one input image is mapped to segmentation maps of the curvilinear features using a deep network having a representation module and a task module. The mapping includes transforming the input image in the representation module using learnable filters configured to balance recognition of curvilinear geometry with reduction of training error. The segmentation maps are produced using the transformed input image in the task module.

22 Claims, 11 Drawing Sheets

(56) References Cited

U.S. PATENT DOCUMENTS

2019/0095791 A1* 3/2019 Liu .................. G06K 9/6273
2020/0103236 A1* 4/2020 Adams ............... G01C 21/3626

OTHER PUBLICATIONS

Chen et al., "DeepLab: Semantic Image Segmentation with Deep Convolutional Nets, Atrous Convolution, and Fully Connected CRFs," IEEE Transactions on Pattern Analysis and Machine Intelligence, Vo. 40, Issue 4, Apr. 1, 2018, 14 pages.

Chen et al., "FSRNet: End-to-End Learning Face Super-Resolution With Facial Priors," in Proceedings IEEE Conference on Computer Vision and Pattern Recognition, Salt Lake City, 2018.

De Bezenac et al., "Deep Learning for Physical Processes: Incorporating Prior Scientific Knowledge," 2018.

Hoover et al., "Locating blood vessels in retinal images by piecewise threshold probing of a matched filter response," IEEE Transactions on Medical Imaging, vol. 19, No. 3, pp. 203-210, 2000.

Li et al., "A Frequency Domain Neural Network for Fast Image Superresolution," 2018 International Joint Conference on Neural Networks, 2018, 9 pages.

Luan et al., "Gabor Convolutional Networks," IEEE Transactions on Image Processing, vol. 27, No. 9, pp. 4357-4366, 2018.

Maninis et al., "Deep Retinal Image Understanding," in International Conference on Medical Image Computing and Computer-Assisted Intervention, Athens, 2016.

Sarwar et al., "Gabor Filter Assisted Energy Efficient Fast Learning Convolutional Neural Networks," IEEE/ACM International Symposium on Low Power Electronis and Design, Jul. 24-26, 2017, 6 pages.

Staal et al., "Ridge-Based Vessel Segmentation of the Retina," IEEE Transactions on Medical Imaging, vol. 23, No. 4, pp. 501-509, 2004.

Tofighi et al., "Deep Networks with Shape Priors for Nucleus Detection," in Proceedings IEEE International Conference on Image Processing, Athens, 2018.

Zhang et al., "Beyond a Gaussian Denoiser: Residual Learning of Deep CNN for Image Denoising," IEEE Transactions on Image Processing, vol. 26, No. 7, pp. 3142-3155, 2017.

European Search Report for EP Application No. 19216742.7 dated Apr. 22, 2020, 8 pages.

Annunziata et al., "Accelerating Convolutional Sparse Coding for Curvilinear Structures Segmentation by Refining SCIRD-TS Filter Banks", IEEE Transactions on Medical Imaging, vol. 35, No. 11, Nov. 2016, pp. 2381-2392.

Azzopardi et al., "Trainable COSFIRE Filters for Vessel Delineation with Application to Retinal Images". Medical Image Analysis, vol. 19, No. 1, Jan. 2015, pp. 46-57.

Strisciuglio et al., "Supervised Vessel Delineation in Retinal Fundus Images with the Automatic Selection of B-COSFIRE Filters", Machine Vision and Applications, vol. 27, No. 8, Jun. 24, 2016, pp. 1137-1149.

* cited by examiner

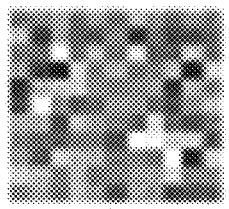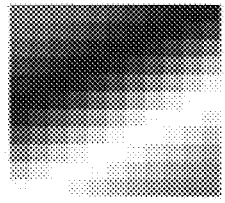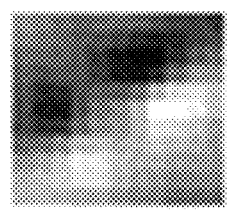
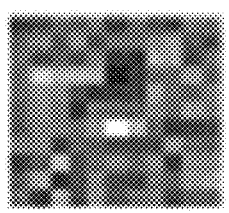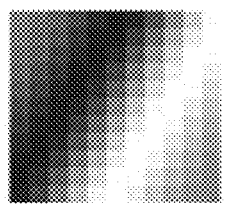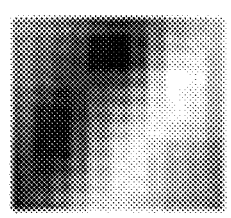
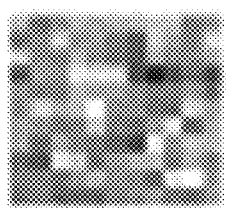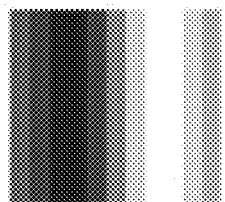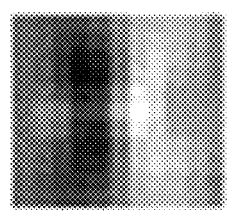
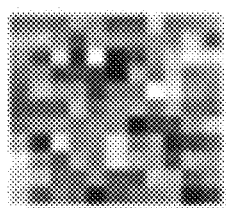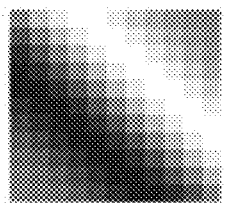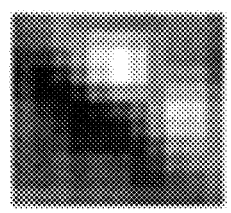
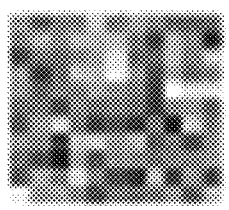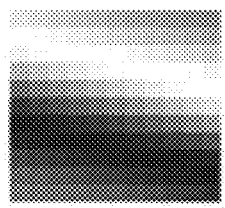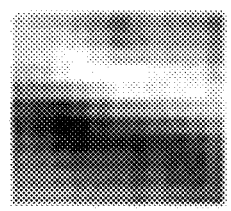
FIG. 5A  FIG. 5B  FIG. 5C

CURVILINEAR OBJECT SEGMENTATION WITH GEOMETRIC PRIORS

TECHNICAL FIELD

The present disclosure is directed to image processing and particularly to image segmentation.

BACKGROUND

Curvilinear objects are found in many scenes in nature, common examples including wrinkles on a human face, cracks on a road, blood vessels in the retina, and roads in a satellite image. Automatic pixel-wise detection and segmentation of curvilinear objects is thus an important computer vision task impacting a wide variety of applications.

SUMMARY

Embodiments described herein involve a method for curvilinear object segmentation. At least one input image comprising curvilinear features is received. The at least one input image is mapped to segmentation maps of the curvilinear features using a deep network having a representation module and a task module. The mapping comprises transforming the input image in the representation module using learnable filters configured to balance recognition of curvilinear geometry with reduction of training error. The segmentation maps are produced using the transformed input image in the task module.

Embodiments involve a system for curvilinear object segmentation. The system comprises a processor and a memory storing computer program instructions which when executed by the processor cause the processor to perform operations. The operations comprise receiving at least one input image comprising curvilinear features. The at least one image is mapped using a processor to produce segmentation maps of the curvilinear features using a deep network having a representation module and a task module. The mapping comprises transforming the input image in the representation module using learnable filters configured to balance recognition of curvilinear geometry with reduction of training error. The segmentation maps are produced using the transformed input image in the task module.

Embodiments described herein involve a non-transitory computer readable medium storing computer program instructions for curvilinear object segmentation. The computer program instructions when executed by a processor cause the processor to perform operations. The operations comprise receiving at least one input image comprising curvilinear features. The at least one image is mapped using a processor to produce segmentation maps of the curvilinear features using a deep network having a representation module and a task module. The mapping comprises transforming the input image in the representation module using learnable filters configured to balance recognition of curvilinear geometry with reduction of training error. The segmentation maps are produced using the transformed input image in the task module.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 5A illustrates visualizations of filters using data-driven training without learnable filters in accordance with embodiments described herein;

FIG. 5B shows visualizations of filters that are not learnable in accordance with embodiments described herein;

FIG. 5C illustrates visualizations of learnable filters in accordance with embodiments described herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Image segmentation refers to grouping of parts of an image that have similar image characteristics. For example, embodiments described herein involve segmentation of curvilinear objects. A deep learning architecture can be used for curvilinear segmentation of images. A significant challenge with deep learning is the need to acquire a large volume of training examples. For tasks such as pixel-level object segmentation, annotation of training images is an arduous, time consuming, and costly task. One way to tackle this problem is to incorporate prior knowledge about the domain and/or task. This prior information effectively reduces the dependence of network optimization on training samples. Embodiments described herein involve a set of regularizers that are introduced in the early representation layers of a neural network. The regularizers may be used to train filters to respond strongly to curvilinear image features at multiple scales and orientations. According to various embodiments, the regularizers are used to train filters to suppress noise in output segmentation maps. Prior information, expressed via the regularizers, is incorporated directly into network training by introducing an additional term in the network loss function that captures domain and/or task constraints.

Figure 1A:
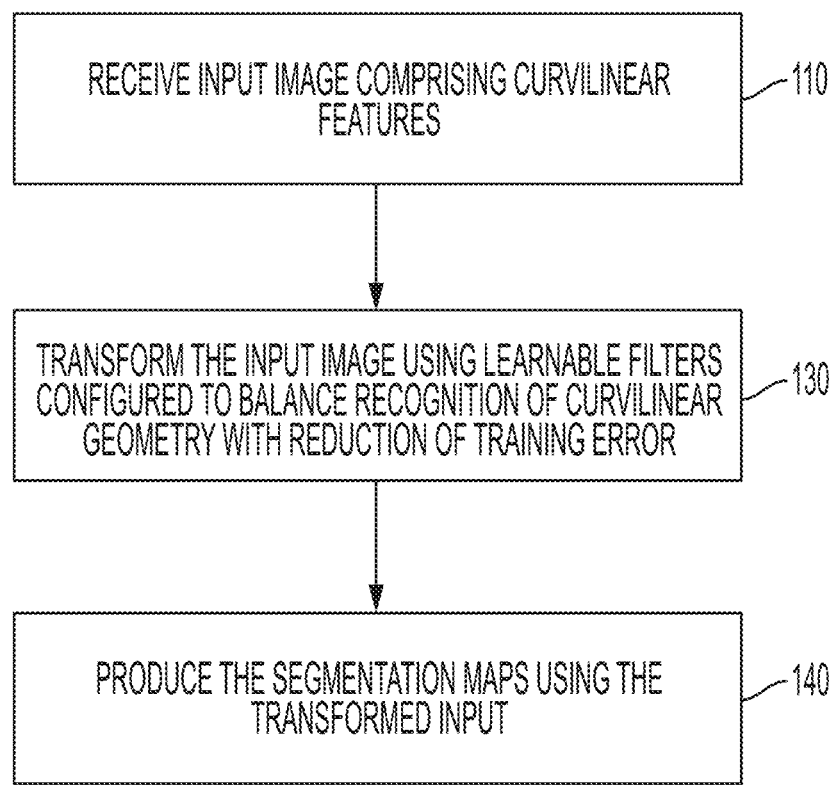
FIGS. 1A and 1B illustrate methods for curvilinear image segmentation using geometric priors in accordance with various embodiments described herein.

FIG. 1A illustrates a method for curvilinear object segmentation in accordance with embodiments described herein. According to FIG. 1A, at least one input image is received 110. According to various configurations, the input image comprises at least one curvilinear feature. For example, the input image may include one or more of roads, blood vessels, machine cracks, and wrinkles on skin. The image is mapped to segmentation maps of the curvilinear features using a processor. According to various embodiments, the at least one image is mapped by minimizing the output of a loss function that is configured to balance recognition of curvilinear features with reduction of training error. The input image is transformed 130 using learnable filters configured to balance a recognition of curvilinear geometry with reduction of training error. The transformed image is used to produce 140 the segmentation maps.

According to various embodiments, a deep network is used to produce the segmentation maps. The deep network may include a representation module and a task module, for example. The input image is transformed 130 in the representation module using learnable filters trained to recognize curvilinear geometries of interest. The task module is configured to produce 140 the segmentation maps using the transformed input image received from the representation module. According to various configurations, the representation module and the task module are configured to be in series such that the input image is transformed in the representation module before entering the task module. According to various configurations, the task module is a U-Net deep neural network.

According to various implementations, at least one of the learnable filters is initialized as a Gabor filter. The Gabor filter may be configured to change during a training process to balance recognition of curvilinear geometry with reduction of training error. In some cases, at least one of the learnable filters has at least one learnable parameter. For example, the at least one learnable parameter may include one or more of a carrier frequency, an eccentricity, an orientation, and a scale.

Figure 1B:
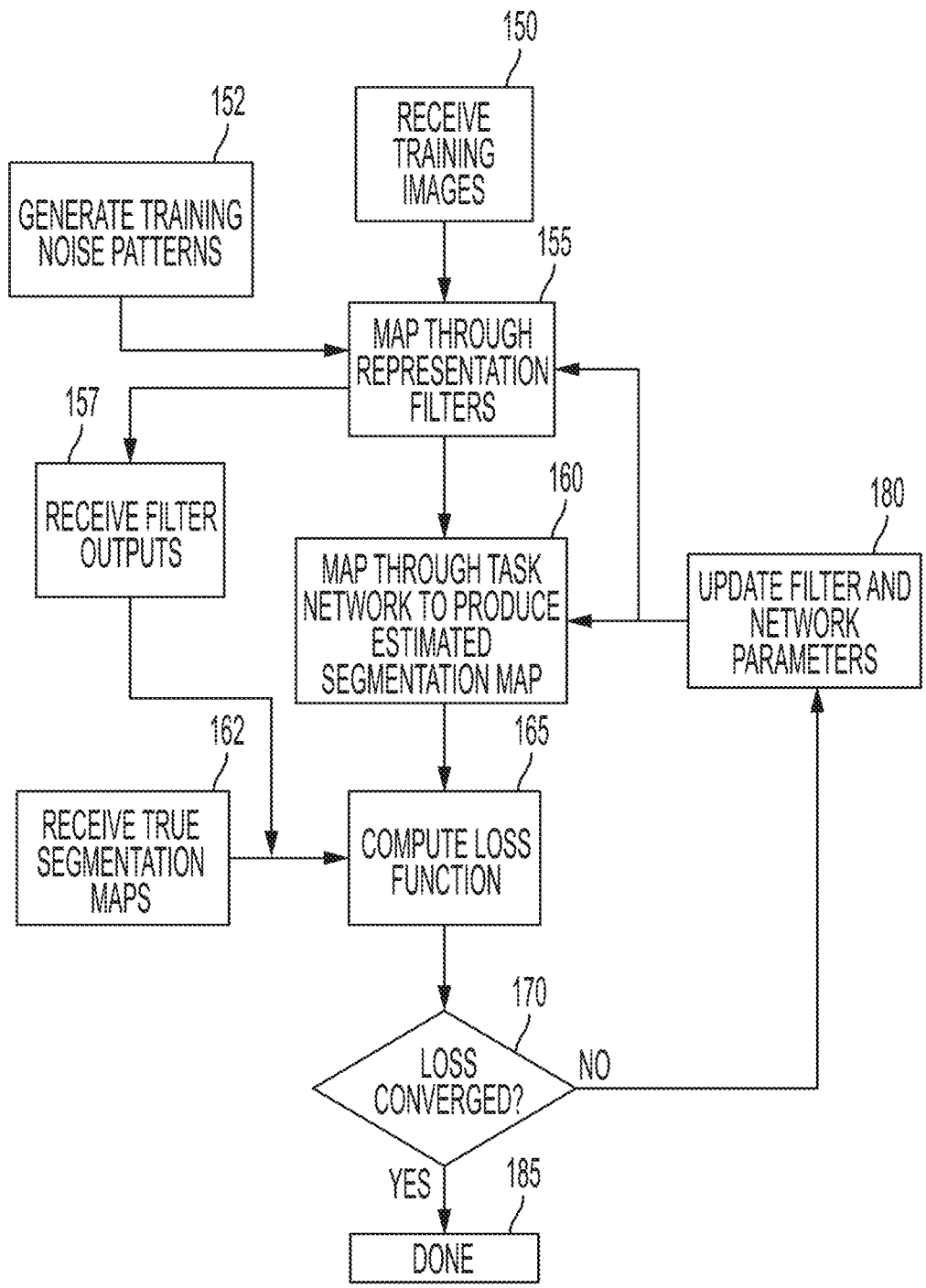

FIG. 1B illustrates a process for training the curvilinear object segmentation network with geometric constraints in accordance with embodiments described herein. The training proceeds as an iterative process as follows. The deep curvilinear segmentation network is initialized with a set of filter weights. Input training images containing curvilinear features are received 150. The input images are sent through the deep curvilinear segmentation network comprising a mapping through learnable representation filters 155 in a representation network and task network 160 to produce estimated segmentation maps.

In parallel, at least two training geometric pattern images are generated 152 and mapped through the learnable filters 155 to produce filtered patterns 157. According to various embodiments, the first training geometric pattern image is of a first orientation and the second training geometric pattern image is of a second orientation that is different than the first orientation. For example, the first orientation may be orthogonal to the second orientation.

The estimated segmentation maps from 160 and true segmentation maps 162 corresponding to training input images are sent to a loss computation module 165, which computes a measure of the error between true and estimated segmentation maps. Additionally, the filtered geometric pattern images from 157 are input to the loss computation module 165 in order to ensure orientation preservation. The loss function balances the network's dual goal of minimizing the segmentation error and preserving geometric orientation constraints. Geometric constraints are preserved by favoring a high response from the first training geometric pattern image and low response from the second training geometric pattern image. According to various configurations, the learnable filters are derived at multiple spatial scales so that curvilinear structures of different sizes and thicknesses may be detected.

It is determined 170 if the loss has converged. In some embodiments, it may be determined 170 that the loss has converged is if the loss does not substantially decrease from the previous iteration. In some cases, it is determined that the loss has converged if the loss change from a previous iteration is less than a predetermined threshold. If it is determined 170 that convergence has occurred, then the training process completes 185. If it is determined 170 that convergence has not occurred, the network parameters are updated via a standard backpropagation technique, and the next iteration begins. At least one input image is received 160. The at least one image is mapped 170 to segmentation maps of the curvilinear features using a processor. The input image is transformed 180 using the learnable filters. The transformed image is used to produce 190 the segmentation maps.

Figure 2A:
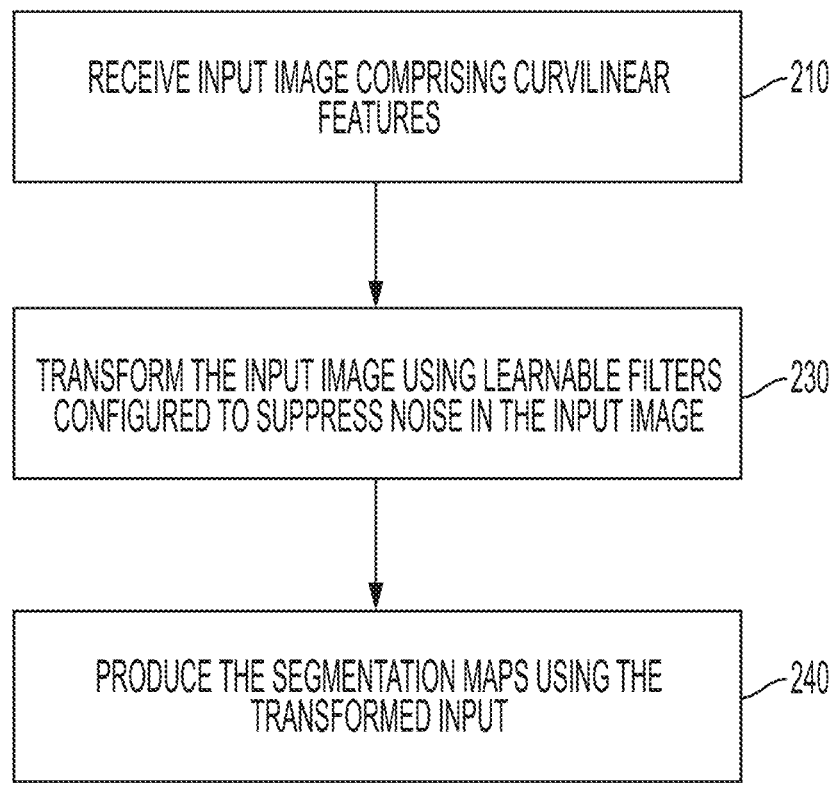
FIGS. 2A and 2B illustrate methods for curvilinear image segmentation using noise priors in accordance with various embodiments described herein.

FIG. 2A illustrates a process for noise suppression in curvilinear object segmentation in accordance with embodiments described herein. At least one input image is received 210. According to various configurations, the input image comprises at least one curvilinear feature. The at least one image is mapped to segmentation maps of the curvilinear features using a processor. According to various embodiments, the at least one image is mapped to segmentation maps by minimizing the output of a loss function that is configured to balance noise suppression with curvilinear segmentation error in training images. According to various configurations, the loss function comprises a sum of a training error between estimated and true segmentation maps corresponding to training images and a noise regularization term. The input image is transformed 230 using learnable filters configured to suppress noise in one or more of a domain and a task of the at least one input image. According to various implementations, at least one of the learnable filters is initialized as a Gabor filter. The transformed image is used to produce 240 the segmentation maps. According to various configurations, the task module is a U-Net deep neural network.

According to various embodiments, a deep network is used to produce the segmentation maps. As described above, the deep network may include a representation module and a task module. The input image is transformed 230 in the representation module using learnable filters configured to balance noise suppression with curvilinear segmentation. The task module is configured to produce 240 the segmentation maps using the transformed input image received from the representation module.

Figure 2B:
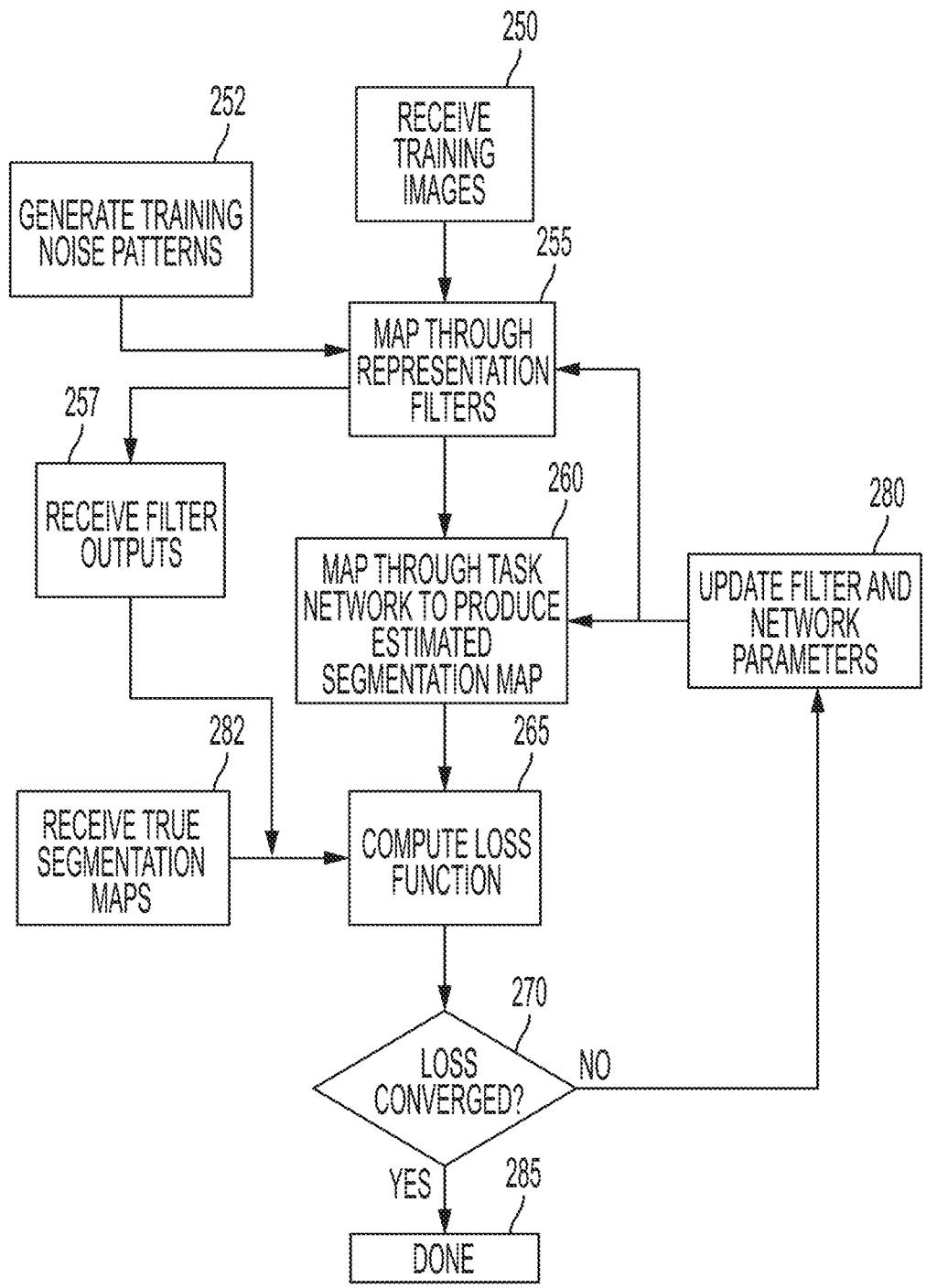

FIG. 2B illustrates a process for training the curvilinear object segmentation network with noise constraints in accordance with embodiments described herein. The training proceeds as an iterative process as follows. The deep curvilinear segmentation network is initialized with a set of filter weights. Input training images containing curvilinear features are received 250. The input images are sent through the deep curvilinear segmentation network comprising a mapping through learnable representation filters 255 in a representation network and task network 260 to produce estimated segmentation maps.

In parallel, at least one training noise image is generated 252 and mapped through the learnable filters 255 to produce filtered noise patterns 257. According to various configurations, the at least one training noise image comprises a noise patterns unique to the domain and the task of the input image. One or more of the noise images may be generated by extracting background patches from the training images that do not contain any labeled curvilinear objects of interest, processing the extracted background patches through filters that are responsive to curvilinear structures, and selecting a predetermined number of background patches having the highest filter responses as the training noise images. In some embodiments, the filters that are responsive to curvilinear structures are chosen as Gabor filters.

The estimated segmentation maps from 260 and true segmentation maps 262 corresponding to training input images are sent to a loss computation module 265, which computes a measure of the error between true and estimated segmentation maps. Additionally, the filtered noise pattern images from 257 are input to the loss computation module 265 to provide a measure of noise in the estimated segmentation map. The loss function balances the network's dual goal of minimizing the segmentation error and minimizing noise in the estimated segmentation map.

It is determined 270 if the loss has converged. In some embodiments, it may be determined 270 that the loss has converged is if the loss does not substantially decrease from the previous iteration. In some cases, it is determined that the loss has converged if the loss change from a previous iteration is less than a predetermined threshold. If it is determined 270 that convergence has occurred, then the training process completes 285. If it is determined 270 that convergence has not occurred, the network parameters are updated via a standard backpropagation technique, and the next iteration begins.

At least one input image comprising curvilinear features is received 260. The image is mapped 270 to segmentation maps of the curvilinear features using a processor. The input image is transformed 280 using the learnable filters configured to suppress noise. The transformed image is used to produce 290 the segmentation maps. It is to be understood that any combination of filters that are configured balance recognition of curvilinear geometry with reduction of training error and filters that are configured to suppress noise may be used to produce the segmentation maps.

Figure 3:
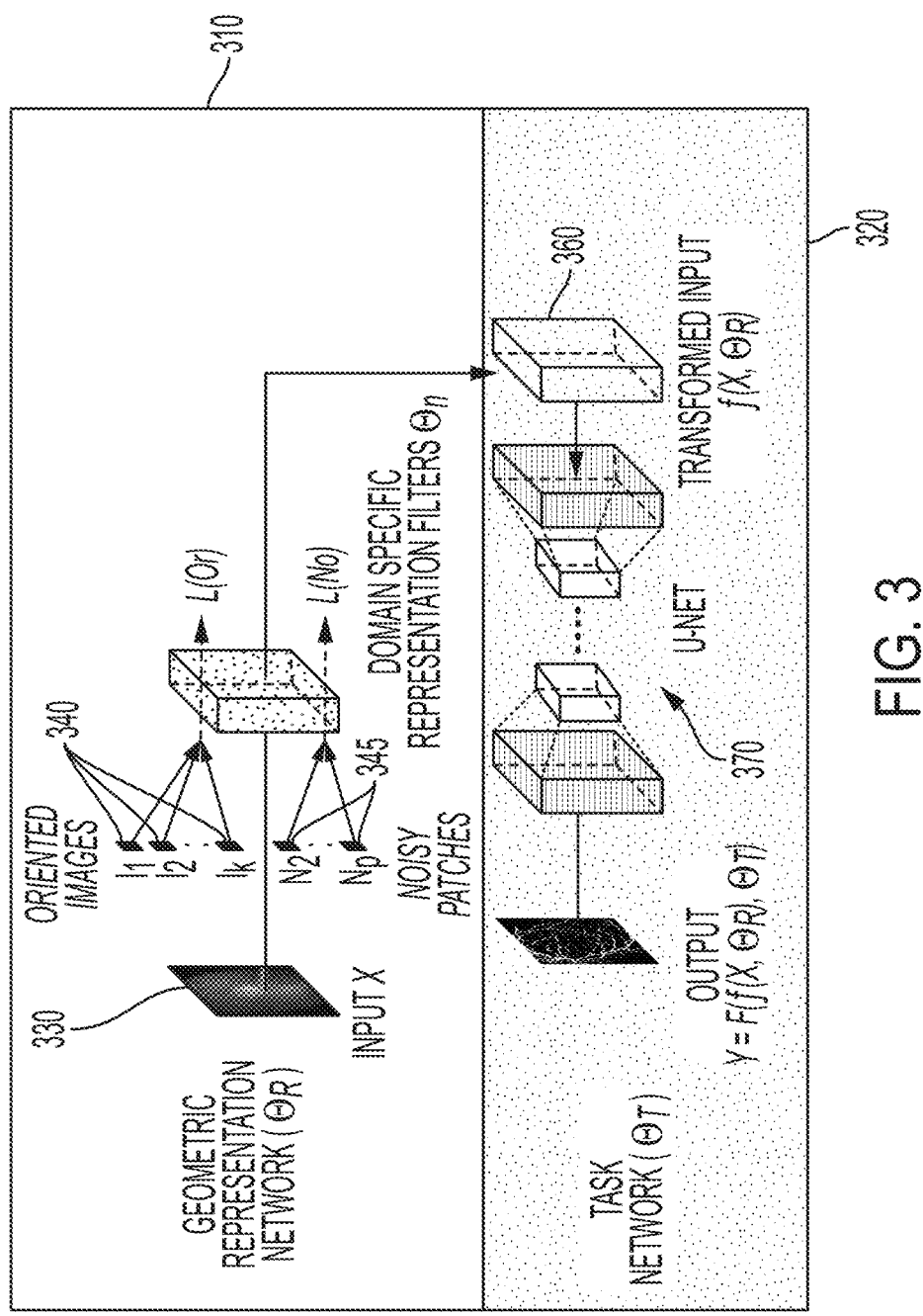
FIG. 3 illustrates a deep learning architecture for curvilinear segmentation in accordance with embodiments described herein.

FIG. 3 illustrates a deep learning architecture for curvilinear segmentation in accordance with embodiments described herein. The system includes a representation module 310 and a task module 320. An image 310 is input into the representation module. The representation module uses learnable filters 330 trained with one or more geometric training images 340 and/or one or more noise training images 345. The learnable filters 350 output a transformed input image 360. The transformed input image 360 is input into the task module 320 and the transformed image is input into one or more filters 370 in the task module which are trained to produce a segmentation map. An output segmentation map 380 is output from the task module.

According to various embodiments described herein, geometric priors are introduced into the representation network to encourage the learnable filters to respond strongly to curvilinear image geometry. For example, the learnable filters may be trained to respond to fine lines that are commonly associated with curvilinear features. The overall system may be optimized to balance training error with respect for curvilinear geometries using the loss function of Equation 1.

$$E = L(Y_g, F(f(X, \Theta_R), \Theta_T)) + L_R(\Theta_R) \qquad (1)$$

Here, f( ) represents the representation module function having parameters with parameters $\Theta_R$ and F( ) represents the task module having parameters $\Theta_T$. $Y_g$ is the ground truth segmentation map, L( ) represents network error on training samples, and $L_R($ ) is the geometric regularization term that incorporates prior knowledge about the task of curvilinear segmentation and is shown in Equation 2.

$$L_{R1} = \Sigma_{k=1}^{M} \Sigma_{i=1}^{N} \|W_{ik} \otimes I_{O_{ik}}\|_F^2 - \|W_{ik} \otimes I_{S_{ik}}\|_F^2, \\ W_{ik} \in \Theta_R \qquad (2)$$

Figure 4B:
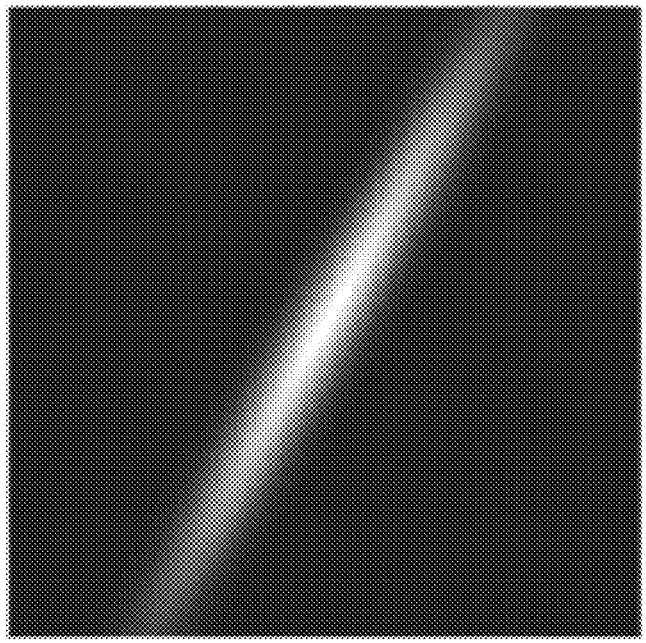
FIG. 4B shows an example second geometric training image in accordance with embodiments described herein.
Figure 4A:
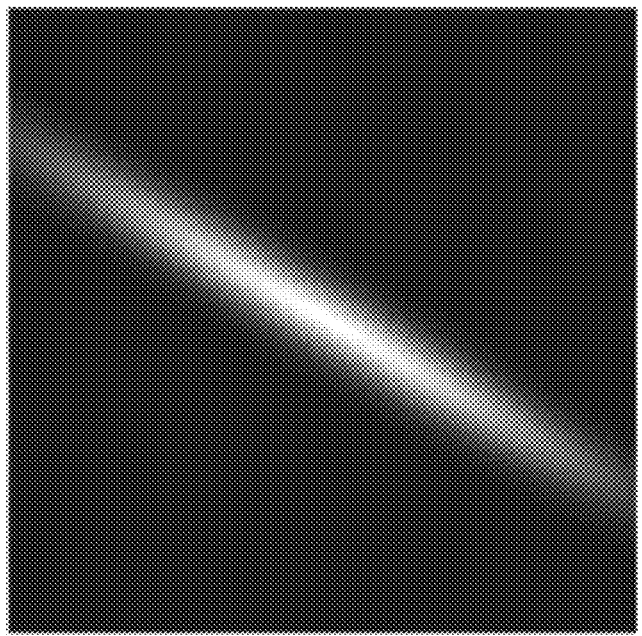
FIG. 4A shows an example first geometric training image in accordance with embodiments described herein.

Here, $I_{S_{ik}}$ represents a first training geometric pattern image comprising strong curvilinear line patterns along the i-th orientation and k-th scale (denoted $S_{ik}$). $I_{O_{ik}}$ represents a second training image with patterns oriented orthogonal to $I_{S_{ik}}$. Examples of these two images are shown in FIGS. 4A and 4B. FIG. 4A shows an example first geometric training image and FIG. 4B illustrates an example second geometric training image. These two images together encourage representation filters at the k-th scale to be oriented along $S_{ik}$. According to various embodiments, the image patterns are formed by a two dimensional Gaussian function at a given scale k applied on the coordinates obtained by rotating a rectangular grid of given size (e.g., 22×22) by a specific angle i. While the example rectangular grid is represented as a square, it is to be understood that the rectangular grid may not be a square.

Using Equations 1 and 2, the $\Theta_R$ parameters are initialized as Gabor filters and then evolve during the network training process to meet the balanced objective of minimizing training error, L, while respecting curvilinear geometry, $L_{R1}$. In some cases, the learnable filters are Gabor filters before a training process and the learnable filters are configured to change during the training process to provide a targeted segmentation for curvilinear features. FIG. 5A illustrates visualizations of filters learned from training that does not incorporate prior knowledge about the domain and/or task in early stages. FIG. 5B illustrates static Gabor filters. FIG. 5C shows visualizations of learnable filters after training for curvilinear feature recognition in accordance with embodiments described herein. Using learnable Gabor filters as described herein preserves a Gabor-like structure that is responsive to curvilinear geometry in images, while retaining the ability to modulate and adapt the Gabor structure based on training exemplars.

According to various configurations, the learnable filters are Gabor filters that have at least one learnable parameter. Equation 3 illustrates an equation that represents a Gabor filter in accordance with embodiments described herein.

$$W_R[i, j] = K_{R1} e^{\frac{-(i^2 + \gamma j^2)}{2\sigma^2}} \cos(2\pi f (i\cos\theta + j\sin\theta)) \qquad (3)$$

In Equation 3, [i,j] are pixel coordinates of an image, $\gamma$ represents the eccentricity, f is the carrier frequency, $\theta$ is the orientation, and $\sigma$ is the scale. In accordance with various embodiments, one or more of $\gamma$, f, $\theta$, and $\sigma$ is a learnable value using training data during training of the system. In this embodiment, the loss function comprises only the data network error on training samples term, L( ), and the second regularization term ($L_{R1}$) in Equation 1 is not used as shown in Equation 4.

$$E = L(X_g, F(f(X, \Theta_R), \Theta_T)) \qquad (4)$$

According to various embodiments, using filters with learnable parameters as described herein represents a significant reduction in the number of trainable parameters when compared to a traditional convolutional neural network where all filter weights must be learned. A reduction in training parameters results in less complexity and reduced training requirements than conventional methods. The ability to learn a few key parameters based on training exemplars endows the network with greater adaptability and expressive power than a static filter representation. Since Equation 4 is smooth and differentiable with respect to all four Gabor parameters, the parameters may be learned via back-propagation.

According to various embodiments, the network used for image segmentation can become more sensitive to noise when training is sparse. Embodiments described herein are configured to improve the robustness of the deep segmentation network to noise in the data. In particular, the issue of false positives that can occur when the background contains features similar to foreground objects is addressed. Incorporating prior knowledge about the domain and/or task into the deep learning task can be used to reduce the dependence of network optimization on noisy training samples. Embodiments described herein describe systems and methods for performing segmentation in a manner that is robust to noise.

According to various configurations, learnable filters can be used to suppress noise in curvilinear image segmentation. Equation 5 shows a loss function that is configured to balance training error with noise suppression in curvilinear image segmentation.

$$E = L(Y_g, F(f(X, \Theta_R), \Theta_T)) + L_{R2}(\Theta_R) \quad (5)$$

Here, $f(\ )$ represents the representation module function having parameters with parameters $\Theta_R$ and $F(\ )$ represents the task module having parameters $\Theta_T$. $Y_g$ is the ground truth segmentation map, $L(\ )$ represents network error on training samples, and $L_{R2}(\ )$ is the noise regularization term that attempts to suppress noise in the data. In accordance with various embodiments, $L_{R2}$ is configured to model noise in curvilinear data segmentation. The calculation for $L_{R2}$ is shown in Equation 6.

$$L_{R2} = \Sigma_{k=1}^{M} \Sigma_{i=1}^{N} \Sigma_{j=1}^{K} \|W_{ik} \otimes I_j\|_F^2, W_{ik} \in \Theta_R \quad (6)$$

Here, $I_j$ are a set of auxiliary training images comprising noise patterns unique to the domain and task and $W_{ik}$ are the weights of filters of scale k in $\Theta_R$. When combined with the $L(\ )$ term in Equation 5, the representation module balances task performance (i.e. curvilinear segmentation) with noise suppression.

According to various embodiments described herein, the noise patterns are generated by extracting background patches from the training images that do not contain any labeled curvilinear objects. These patches are sent through filters such as Gabor filters, for example. A predetermined number of patches that give a maximum response are selected as potential noisy patches (i.e. patches that are most likely to be confused with curvilinear structures). According to various implementations, the patch size of noisy patches is selected to be 64×64 and 100 patches with maximum response are chosen.

Example 1

Embodiments described herein are demonstrated for the example application of retinal vessel segmentation. This is an important capability that enables medical experts to quickly diagnose pathology in vascular pathways in the human retina. The DRIVE [11] (see J. Staal, M. D. Abramoff, M. Niemeijer and M. Van Ginneken, "Ridge-Based Vessel Segmentation of the Retina," *IEEE Transactions on Medical Imaging*, vol. 23, no. 4, pp. 501-509, 2004) and STARE (see A. Hoover, V. Kouznetsova and M. Goldbaum, "Locating blood vessels in retinal images by piecewise threshold probing of a matched filter response," *IEEE Transactions on Medical Imaging*, vol. 19, no. 3, pp. 203-210, 2000) datasets were used to train and evaluate the techniques. The network architecture is as follows. For the representation layer, 12 Gabor filters of size 11×11 of orientations sampled uniformly between 0 and 180 degrees were used. For the task network, a U-Net architecture was used. The representation network was trained using standard stochastic gradient optimization technique with the help of the Adam optimizer and the learning rate was set to 0.0005. Patches of size 128×128 were extracted from the training images, resulting in about 7000 patches from 20 training images. A limited training scenario was also evaluated, wherein 700 patches from 2 images were extracted. A batch size of 64 for training the network was used. For initial validation, only a single scale of Gabor regularization was tested. For inference, the network was used on the entire image instead of patches. The following methods were evaluated Gabor regularized, Gabor parameterized, and Deep Retinal Image Understanding (DRIU).

Tables 1 and 2 show results for the full training and limited training scenarios, respectively. Results are presented in terms of the Dice coefficient, which is a normalized measure of overlap between two binary maps. The Gabor-regularized and a Gabor-parameterized methods are competitive in both scenarios, and outperform the state of art DRIU by a significant margin in the limited training scenario. The proposed approach trained with the limited dataset outperforms DRIU trained with the full dataset.

TABLE 1

| Method | Dice Overlap Score |
| --- | --- |
| DRIU | 0.7389 |
| Gabor Regularized | 0.8031 |
| Gabor Parameterized | 0.7956 |

TABLE 2

| Method | Dice Overlap Score |
| --- | --- |
| DRIU | 0.6318 |
| Gabor Regularized | 0.7430 |

Figure 6B:
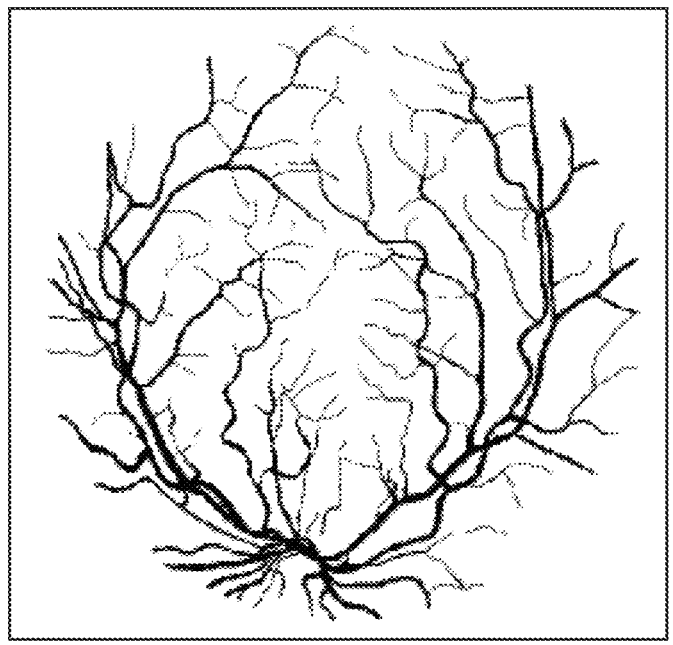
FIG. 6B illustrates the ground truth segmentation map for the original image of Examples 1 and 2 in accordance with embodiments described herein.
Figure 6A:
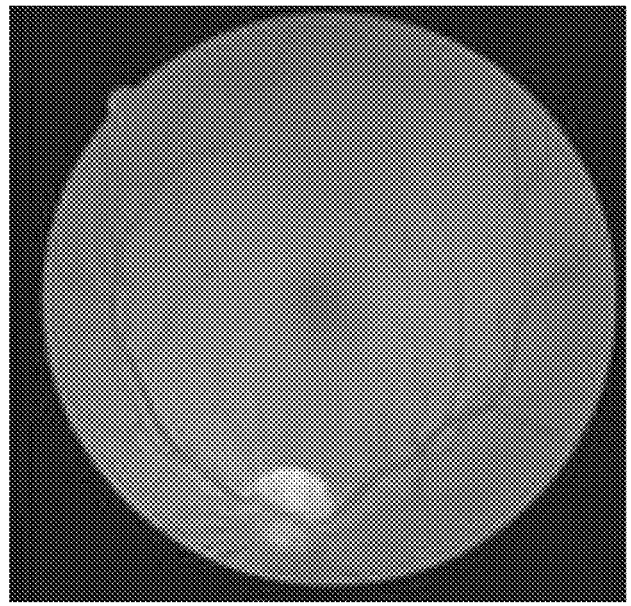
FIG. 6A shows the original image for Examples 1 and 2 in accordance with embodiments described herein.
Figure 7A:
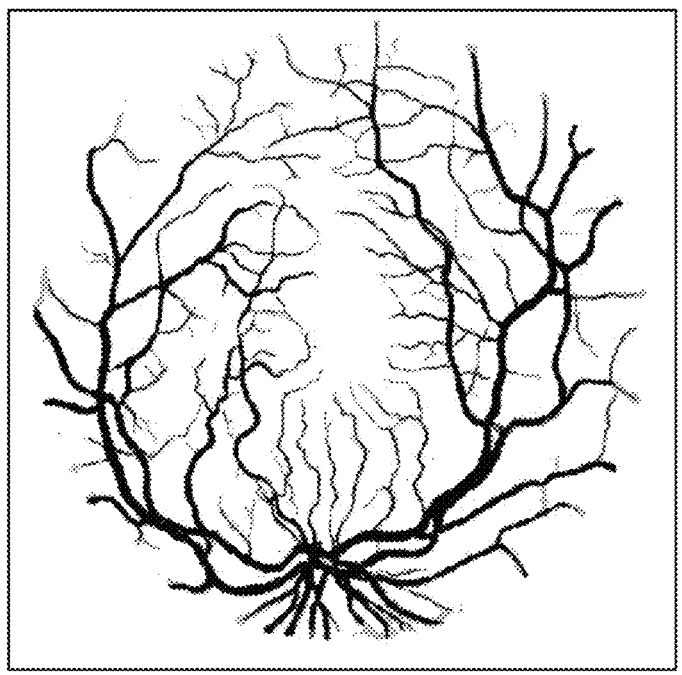
FIGS. 7A and 7B show the resulting segmentation maps of Example 1 using different techniques in accordance with embodiments described herein.
Figure 7B:
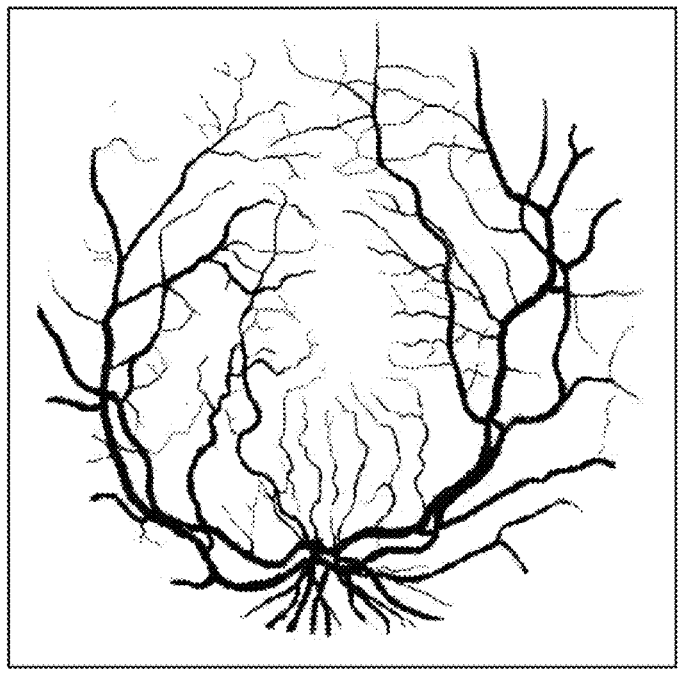

FIG. 6A shows the original input for Example 1. The ground truth map of the desired curvilinear features is shown in FIG. 6B. FIG. 7A shows the result segmentation map using DRIU where the grey portions represent an incorrect result and the white portions represent a correct result. FIG. 7B shows the result using the Gabor Regularized system described herein. As can be observed from FIGS. 7A and 7B, more white and less grey is present in the Gabor regularized segmentation results when compared with the DRIU result.

Example 2

Example 2 shows the results of noise suppression in retinal image segmentation. Accurate and robust segmentation is useful for accurate and robust diagnostics of disease. Again, the DRIVE and STARE image datasets were used to both train and test the various techniques. For the representation layer, 12 Gabor filters of size 11×11, with orientations sampled uniformly between 0 and 180 degrees were used. For the task network, U net architecture was used for segmentation. The network was trained using standard stochastic gradient optimization techniques with the help of the Adam optimizer and the learning rate was set to 0.0005. Patches of size 128×128 were extracted from the training images. A total of about 7000 patches were extracted from 20 training images. For limited training scenario, patches from 2 images were extracted for a total of almost 700 patches. A batch size of 64 patches was used for training. For inference, the network was used on the entire image instead of patches.

The following methods were evaluated noise regularized curvilinear segmentation net (NRCSN) as described herein and DRIU. Table 3 compares the proposed methods with the DRIU technique using the Dice overlap, a measure of overlap between estimated and ground truth segmentation maps. The proposed approach outperforms DRIU by a clear margin for the full training case and by an even broader margin for the low training scenario. Interestingly, the proposed approach with sparse training outperforms DRIU with full training.

TABLE 3

| Method | Dice Overlap Score |
| --- | --- |
| DRIU | 0.6318 |
| NRCSN | 0.7459 |

Figure 8B:
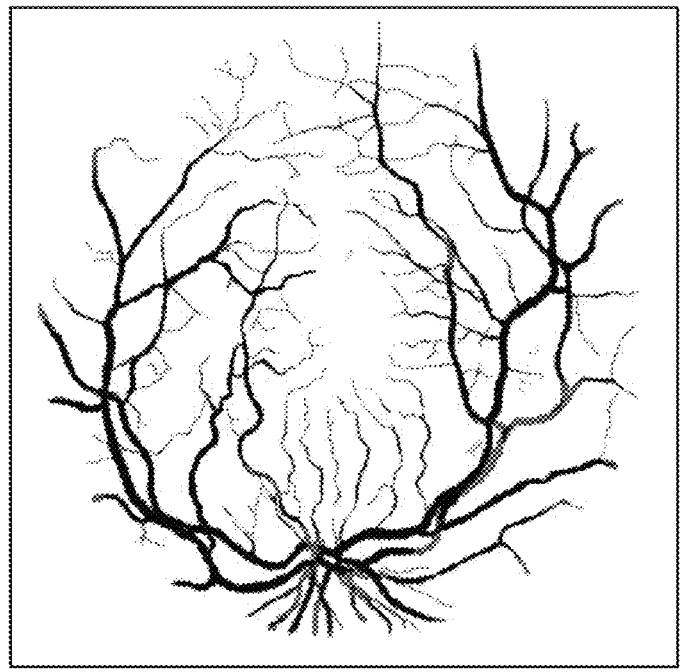
FIGS. 8A and 8B show the resulting segmentation maps of Example 8 using different techniques in accordance with embodiments described herein.
Figure 8A:
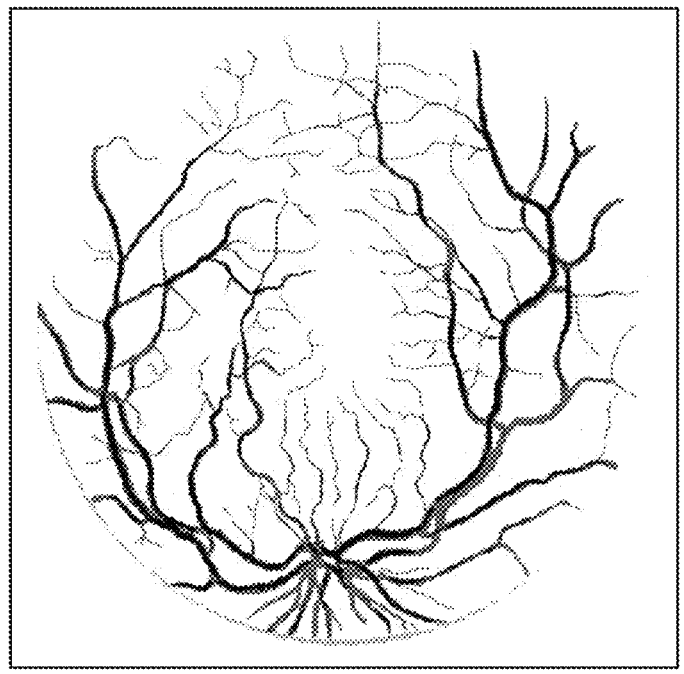

FIG. 6A shows the original input for Example 2. The ground truth map of the desired curvilinear features is shown in FIG. 6B. FIG. 8A shows the result segmentation map using DRIU where the grey portions represent an incorrect result and the white portions represent a correct result. FIG. 8B shows the result using the NRCSN system described herein. As can be observed from FIGS. 8A and 8B, more white and less grey is present in the NRCSN segmentation results when compared to the DRIU results.

Figure 9:
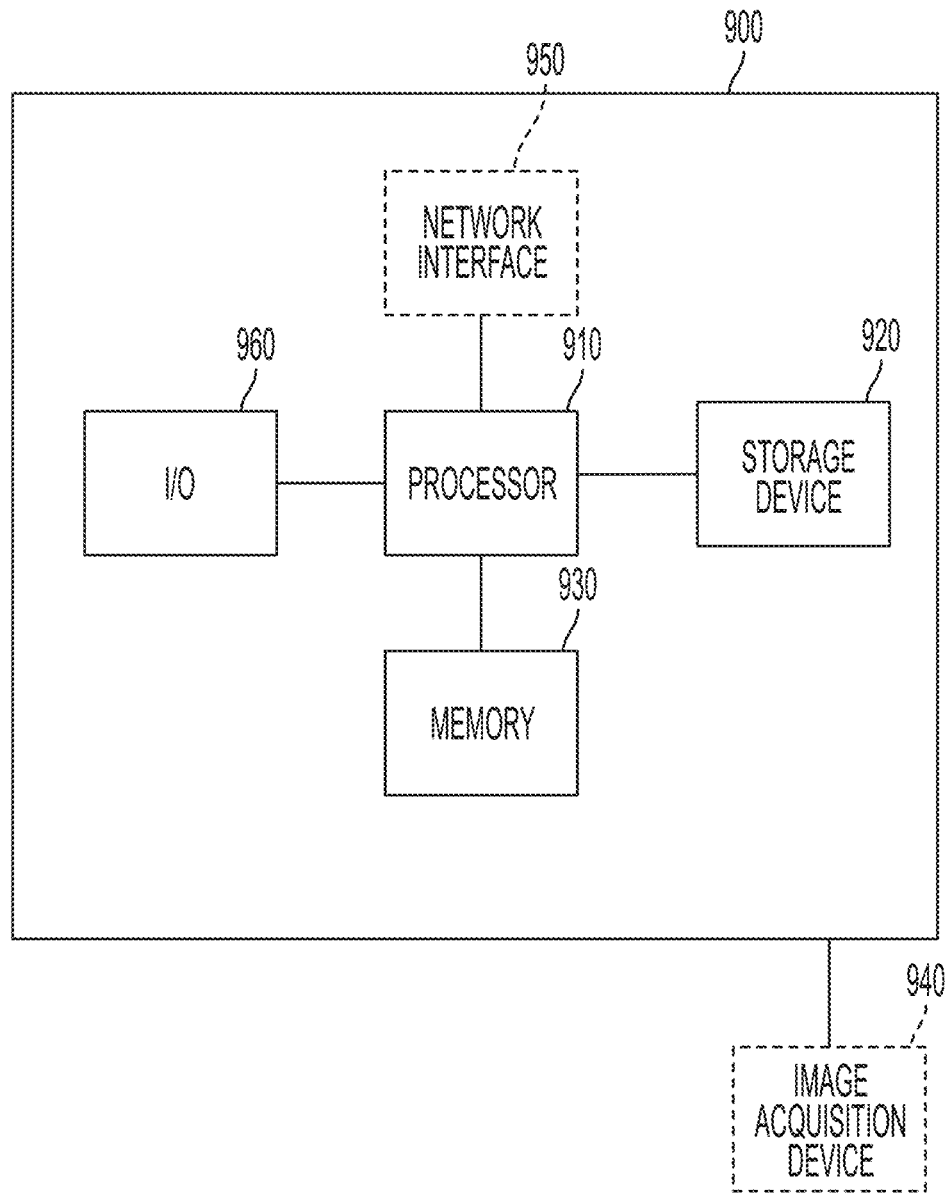
FIG. 9 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 8. Computer 900 contains a processor 910, which controls the overall operation of the computer 900 by executing computer program instructions which define such operation. The computer program instructions may be stored in a storage device 920 (e.g., magnetic disk) and loaded into memory 930 when execution of the computer program instructions is desired. Thus, the steps of the methods described herein may be defined by the computer program instructions stored in the memory 930 and controlled by the processor 910 executing the computer program instructions. An image acquisition device 940 may be connected to the computer 900 to input image data to the computer 900. According to various configurations, the image acquisition device 940 is disposed on the computer 900. In some cases, the image acquisition device 840 and the computer 900 communicate wirelessly through a network. According to various implementations, the computer 900 may be located remotely from the image acquisition device 940, and the computer 900 may perform method steps as part of a server or cloud based service. The computer 900 may include one or more network interfaces 950 for communicating with other devices via a network. The computer 900 also includes other input/output devices 960 that enable user interaction with the computer 900 (e.g., display, keyboard, mouse, speakers, buttons, etc.). Such input/output devices 960 may be used in conjunction with a set of computer programs as an annotation tool to annotate volumes received from the image acquisition device 900. According to various embodiments, FIG. 9 is a high level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed to embodiments can be applied individually or in any combination, not meant to be limiting but purely illustrative. It is intended that the scope be limited by the claims appended herein and not with the detailed description.

What is claimed is:

1. A method for curvilinear object segmentation, comprising:
    receiving at least one input image comprising curvilinear features; and
    mapping, using a processor, the at least one image to segmentation maps of the curvilinear features using a deep network having a representation module and a task module, the mapping comprising:
        transforming the input image in the representation module using learnable filters configured to balance recognition of curvilinear geometry with reduction of training error; and
        producing the segmentation maps using the transformed input image in the task module.

2. The method of claim 1, wherein the input image comprises one or more of roads, blood vessels, machine cracks, and wrinkles on skin.

3. The method of claim 1, wherein the mapping is derived by a training process comprising minimizing a loss function, the loss function configured to balance recognition of curvilinear geometry with reduction of training error.

4. The method of claim 3, wherein the loss function comprises a sum of a training error and a geometric regularization term that incorporates prior knowledge about the task of curvilinear segmentation.

5. The method of claim 3, wherein at least one of the learnable filters is initialized as a Gabor filter.

6. The method of claim 5, wherein the Gabor filter is configured to change during a training process to balance recognition of curvilinear geometry with reduction of training error.

7. The method of claim 3, wherein the at least one learnable filter has at least one learnable parameter.

8. The method of claim 7, wherein the at least one learnable parameter comprises one or more of a carrier frequency, an eccentricity, an orientation, and a scale.

9. The method of claim 3, further comprising training the learnable filters with at least one training geometric pattern image.

10. The method of claim 9, wherein the at least one training geometric pattern image comprises at least one of a first training geometric pattern image and at least one of a second training geometric pattern image, the first training geometric pattern image having patterns with a first orientation and the second training geometric pattern image having patterns with a second orientation, the first orientation different than the second orientation.

11. The method of claim 10, wherein the first orientation is orthogonal to the second orientation.

12. The method of claim 10, wherein the at least one learnable filter is configured to produce a high response to the first training image and a low response to the second training image.

13. The method of claim 3 wherein the learnable filters are derived at multiple spatial scales.

14. The method of claim 1, wherein the task module is a U-Net deep neural network.

15. A system for curvilinear object segmentation, comprising:
a processor; and
a memory storing computer program instructions which when executed by the processor cause the processor to perform operations comprising:
receiving at least one input image comprising curvilinear features; and
mapping, using a processor, the at least one image to produce segmentation maps of the curvilinear features using a deep network having a representation module and a task module, the mapping comprising:
transforming the input image in the representation module using learnable filters configured to balance recognition of curvilinear geometry with reduction of training error; and
producing the segmentation maps using the transformed input image in the task module.

16. The system of claim 15, further comprising training the learnable filters with a first set of training images and a second set of training images, the first set of training images having patterns with a first orientation and the second set of training images having patterns with a second orientation, the first orientation different than the second orientation.

17. The method of claim 16, wherein the at least one learnable filter is configured produce a high response to the first training image and a low response to the second training image.

18. The system of claim 15, wherein the processor is configured to minimize a loss function, the loss function configured to balance recognition of curvilinear geometry with reduction of training error.

19. The system of claim 18, wherein the loss function comprises a sum of a training error and a geometric regularization term that incorporates prior knowledge about the task of curvilinear segmentation.

20. The method of claim 18, wherein at least one of the learnable filters is initialized as a Gabor filter.

21. The method of claim 18, wherein the at least one learnable filter has at least one learnable parameter.

22. A non-transitory computer readable medium storing computer program instructions for curvilinear object segmentation, the computer program instructions when executed by a processor cause the processor to perform operations comprising:
receiving at least one input image comprising curvilinear features; and
mapping, using a processor, the at least one image to produce segmentation maps of the curvilinear features using a deep network having a representation module and a task module, the mapping comprising:
transforming the input image in the representation module using learnable filters configured to balance recognition of curvilinear geometry with reduction of training error; and
producing the segmentation maps using the transformed input image in the task module.

* * * * *